Patented June 30, 1936

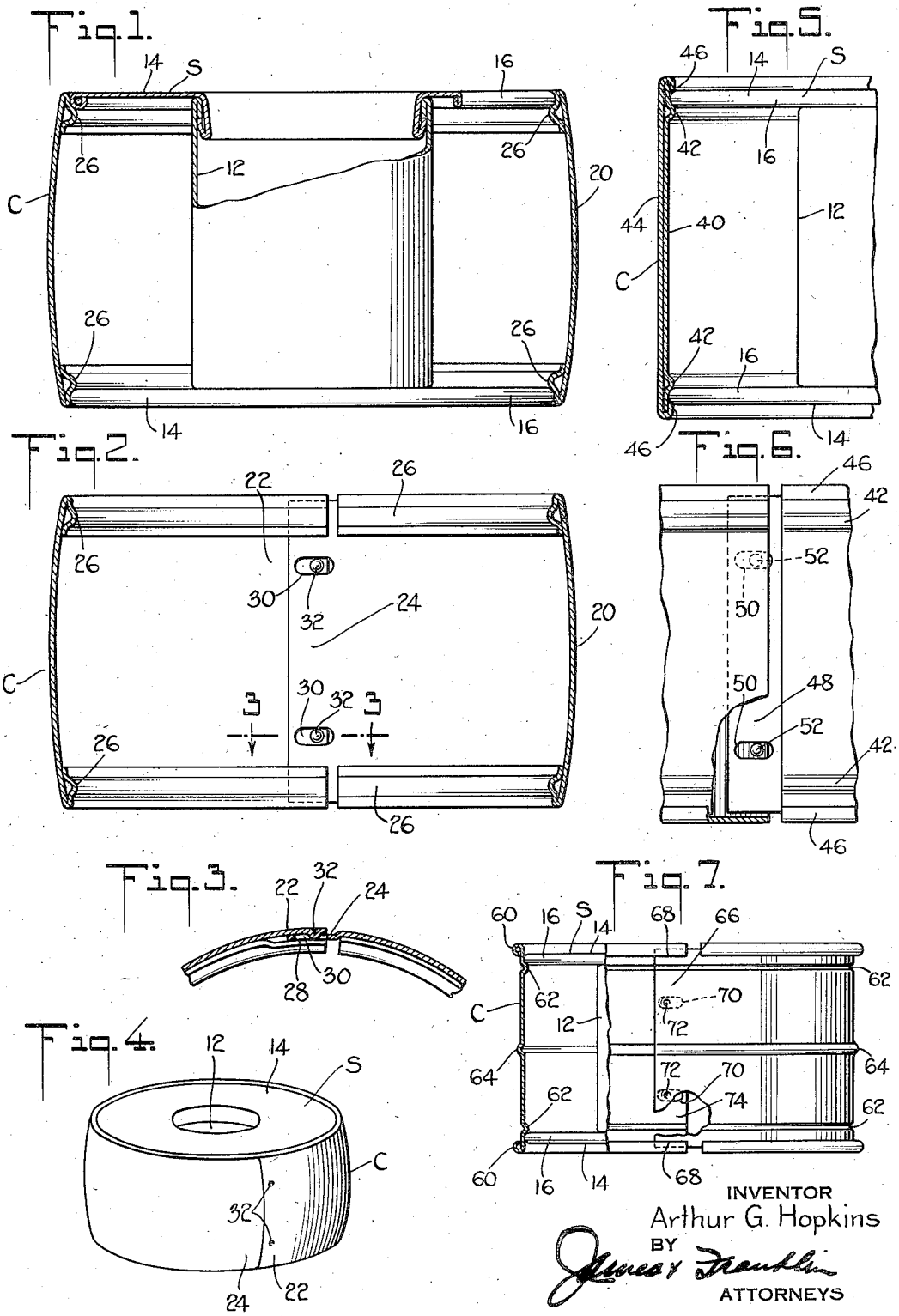

2,045,652

UNITED STATES PATENT OFFICE 2,045,652

SPOOL COVER

Arthur G. Hopkins, Maspeth, N. Y., assignor to National Can Company, a corporation of Delaware Application June 14, 1933, Serial No. 675,675

16 Claims. (Cl. 206—52)

This invention relates to spool covers, and more particularly to ring-like covers adapted to receive an adhesive tape spool or the like with spring engagement.

The primary object of the present invention is to generally improve spool covers such as are used as a dust-proof housing for adhesive tape and the like. More particular objects are to devise such a spool cover which will be readily yieldable so that the spool is easily slipped in to or out of place and yet which will accurately and definitely locate and hold the spool within itself, and will fully enclose the spool with a close and dust-proof fit. A further object is to provide a spool and cover or container assembly which may be taken apart by pushing the spool in either direction, the arrangement being essentially symmetrical and equally well operable from either side. Still another object of my invention resides in so facilitating the insertion and removal of the spool from the spool cover that the operation may be conveniently accomplished while using only one hand, thus leaving the other hand free to hold the bandage or other material to which the tape is to be applied. Other objects are to construct a spool cover which is compact, light, simple, and cheap to manufacture.

To the accomplishment of the foregoing and such other objects as will hereinafter appear, my invention consists in the spool cover or container elements and their relation one to the other, as hereinafter are more particularly described in the specification and sought to be defined in the claims. The specification is accompanied by a drawing, in which:

Fig. 1 is a section through a preferred form of container and spool assembly;

Fig. 2 is a section with the spool removed;

Fig. 3 is a section taken in the plane of the line 3—3 of Fig. 2;

Fig. 4 is a perspective view of the spool and container assembly;

Fig. 5 is a fragmentary section through a modified form of spool cover;

Fig. 6 shows the expansion joint employed therein; and

Fig. 7 is a partially sectioned view of still another form of spool cover embodying features of my invention.

Referring to the drawing and more particularly to Figs. 1 to 4 thereof, the assembly comprises a spool S and a cover C, the cover and spool being so related that the spool is readily slipped into or removed from the cover. The spool may be of any desired type and comprises a cylindrical tape-receiving portion 12 and a pair of circular side walls or flanges 14 which are secured to the cylindrical portion 12. The edges of the flanges 14 may be finished in any desired manner, as by the use of beads 16.

The cover C comprises a ring or band 20 the ends 22 and 24 of which are relatively slidable, thus permitting relatively free expansion or opening of the band 20. The configuration of the band is preferably made such that it tends normally to close to its small dimension, and this dimension is made such as will close snugly upon the spool. The band is provided with marginal beads 26 which bear against the beaded edges 14 of the spool and anchor or locate the spool within the cover. It will be understood that the minimum diameter of the spool-locating beads 26 is substantially smaller than the maximum diameter of the spool flanges, and the parts together form a secure and dust-proof assembly. Nevertheless the spool is readily slipped out of the cover, as by pressure with the thumb while holding the cover in one hand, because of the relatively free expansion permitted the cover by reason of the slidable junction of the ends 22 and 24 thereof. The operation, although a spring engagement, is surprisingly smooth and silent, instead of forceful, abrupt, and noisy, as with the more usual "snap engagement".

Considering the arrangement in greater detail, the band 20 is preferably made up of a single strip of sheet metal the side edges of which are folded inwardly and beaded to form the spool-locating beads 26. The intermediate wall of the cover is preferably bent convexly outwardly, as will be evident from inspection of the drawing, for this configuration together with the use of the reinforced marginal beads gives the spool cover increased stiffness against bending. The over-all configuration is, of course, made such that the band tends to close to its minimum dimension, and distortion or deformation caused by passage of the spool through the cover is resisted by a resilient or spring-like restoring force set up in the band.

One end of the band, in this case the end 24, is extended beyond the beads 26 to form a thin flat tongue, heretofore numbered 24, while the marginal folds at the other end of the band, the end 22, are opened slightly, as is best shown at 28 in Fig. 3, to receive the tongue 24. The minimum dimension of the cover is, of course, determined by the ends of the beads 26 coming into direct abutment. The maximum diameter of the cover need not be definitely limited, and, if desired, the tongue 24 may be substantially elongated to minimize the possibility of disengagement of the ends of the band. I prefer, however, to provide definite stop means to limit the expansion or opening of the band, and such stop means are here exemplified by the use of elongated slots 30 cut through tongue 24 in a circumferential direction, and mating teats or dots 32 struck inwardly on the outer surface of the end 22 of the band, said teats 32 engaging slots 30 and limiting the separation of the ends 22 and 24 of the band. The expansion thus permitted is, of course, made ample to accommodate the spool when it is forced through the cover.

In Figs. 5 and 6 I show a modified form of my invention in which the cover C is made somewhat heavier and is preferably built up of two layers of material. In this form of the invention the band comprises an inner strip of metal 40 which is forced or rolled inwardly to form the spool-locating beads 42, and an outer strip of metal 44 the edges of which are folded inwardly and clamped upon the edges of the inner strip 42. In this manner the strips are combined to form a single relatively rigid assembly which, while compact in size, possesses considerable spring when opened or deformed. It will be noted from inspection of Fig. 5 that the inwardly turned edges 46 are preferably so located and dimensioned as to provide in effect another pair of locating beads which bear against the outer edges of the spool flanges, so that with this construction each flange is held between inner and outer locating means.

Here again the ends of the band are preferably relatively slidable, and the manner in which this result is accomplished will be evident from an inspection of Fig. 6 in which it will be seen that one of the strips, in this case the outer strip 44, is extended beyond the other or inner strip 40 49 at one end of the band, thereby forming a projecting tongue 48. The inner and outer strips 40 and 44 are separated slightly at the other end of the band, thereby forming a space which receives and physically houses the tongue 48, it sliding readily between the inner and outer strips. The tongue is, of course, preferably displaced inwardly slightly, in the manner shown in Fig. 3, thereby bringing it in alignment with the space between the inner and outer strips 40 and 44 and permitting the outer strips to come into substantially flush abutting relationship when the cover is closed to its small dimension.

Here again the sliding joint at the ends of the band is preferably provided with stop means to limit the expansion of the cover, and for this purpose mating slots 50 are formed on the tongue 48, while teats or dots 52 are struck into one of the strips, in this case the outer strip 44, the teats 52 passing into the slots 50.

Still another form of my invention is shown in Fig. 7. In this form the spool S may be like that heretofore described and is received in a cover formed of a single strip of sheet metal. In the present construction the edges of the strip of metal are rolled outwardly to form flanges 60, and the strip is intermediately beaded inwardly to form the spool-locating beads 62. The strip may be additionally beaded outwardly, as at 64, to help rigidify the same.

At one end of the band the strip is extended beyond the flanges 60 to form a thin flat tongue 66, while at the opposite end of the band the beads 60 are cut away slightly or pried upwardly or otherwise opened at the point 68 to receive the tongue 66. Inward movement of the parts is limited by the ends of flange 60 coming into direct abutment. Outward movement is limited by the use of mating slots 70 and teats 72, the slots preferably being cut through the inside end 74 of the band, and the teats 72 preferably being struck inwardly on the opposite end of the band which, in the present case, is the projecting tongue 66.

It will be noted that in all forms the invention is generically characterized by the use of a ring or band of material which surrounds and encloses the spool. This band is provided with holding or locating means for engaging the edges of the spool flanges, and, while such holding means may be discontinuous, they are preferably in the form of continuous beads as here illustrated, thereby providing a dust-proof closure. The ends of the band are relatively slidable, thus making the same freely expansible for the reception or ejection of the spool. In each case the configuration of the band is made such that it tends normally to close to its small dimension with a springy or resilient resistance to expansion. This springiness is enhanced by the beads and convex shape in the first form of cover; by the beads and double thickness of metal in the second form of cover; and by the flanges and beads in the third form of cover. The resulting expansion is in each case preferably limited by the use of appropriate stop means, the primary function of which is to prevent the tongue formed at one end of the band from being pulled out of the mating space formed at the other end of the band.

It is believed that the mode of constructing and using, as well as the many advantages of my improved spool cover, will be apparent from the foregoing detailed description. The cover is compact, light, simple, and cheap to manufacture. It is readily yieldable, thus permitting the spool to be removed from the cover with the fingers of only a single hand. Despite this fact the spool is accurately located by locating beads of ample proportion, and the cover and spool form a fully enclosed and dust-proof housing. The spool is removable from or insertable into either side of the cover, thus adding to the convenience with which it may be manipulated.

It will be apparent that while I have shown and described my invention in preferred forms, many changes and modifications may be made in the structures disclosed without departing from the spirit of the invention, defined in the following claims.

I claim:

1. A container for a spool, said container comprising a ring or band of sheet metal provided with inwardly projecting means for receiving and locating the side walls of the spool in place, said means being so shaped as to facilitate reception and discharge of the spool by movement of the spool axially of the cover, the ends of the band being relatively slidable to permit expansion of the container during reception or discharge of the spool by axial movement as aforesaid, one end of said band having a tongue slidably received in a mating space formed in the other end of said band, said tongue being provided with slots, and the other end of the band being provided with teats projecting into the slots and operating to limit the permissible expansion of the container.

2. A container for a tape spool, said container comprising a ring or band of sheet metal provided with marginal beads for receiving and locating the side walls of the spool in place, said beads being so rounded in section, that is, in the direction of the axis of the container, as to facilitate reception and discharge of the spool by movement of the spool axially of the cover, the ends of the band being relatively slidable to permit expansion of the container during reception or discharge of the spool by axial movement as aforesaid, the configuration of the band being such as to provide spring tension tending to close the band to its small dimension, one end of said band being formed into a tongue slidably received in a mating space formed in the other end of said band, said tongue being provided with a pair of circumferentially directed slots, and the other end of the band being provided with teats projecting into the slots and operating to limit the permissible expansion of the container.

3. A spool cover comprising a closed ring or band of sheet metal the ends of which overlap and are relatively slidable to permit ready expansion of the container to receive or discharge the spool, the band consisting of a single strip of sheet metal the edges of which are folded inwardly and ridged to provide marginal spool-anchoring beads, one end of said band projecting beyond the beads to form a wide tongue, the other end of said band having the beads opened slightly to receive the edges of the tongue.

4. A container for a tape spool, said container comprising a ring or band of sheet metal the ends of which are relatively slidable to permit ready expansion of the container to receive or discharge the spool, the band consisting of a single strip of sheet metal the edges of which are folded inwardly and ridged to provide marginal spool-anchoring beads, the intermediate portion of the band being outwardly convex to make the same resiliently yieldable, one end of said band projecting beyond the beads to form a tongue, the other end of said band having the beads opened slightly to receive the tongue, said tongue being slotted and the other end of the band having teats engaging the slots and limiting the permissible outward expansion of the band.

5. In combination, a tape spool and a container therefor, said tape spool comprising a cylindrical tape-receiving portion and circular side walls or flanges secured thereto, said container comprising a ring or band of sheet metal provided with marginal beads for receiving and locating the side walls of the spool in place, the peripheries of the spool flanges and the beads of the container being relatively rounded in section in order to facilitate sliding of the spool through the container, the ends of the band being relatively slidable to permit ready expansion of the container during sliding of the spool through the container, the configuration of the band being such as to provide spring tension tending to close the band to its small dimension, one end of said band being formed into a tongue slidably received and housed in a mating space formed in the other end of said band, said tongue being provided with slots and the other end of the band having teats projecting into the slots and operating to limit the permissible expansion of the container.

6. In combination, a tape spool and a spool cover therefor, said tape spool comprising a cylindrical tape-receiving portion and circular side walls or flanges, said cover comprising a closed continuous ring or band of sheet metal provided with inwardly projecting means for receiving and locating the flanges of the spool in place, the ends of the band overlapping and being relatively slidable to permit expansion of the cover during reception or discharge of the spool by axial movement therethrough, said band being resilient and tending normally to close to its small dimension, the peripheral edges of the spool flanges and the inwardly projecting spool locating means of the cover being so relatively shaped in section, i. e., in the direction of the axis of the cover, as to facilitate reception and discharge of the spool by movement of the same axially through the cover when the cover is closed under its normal tendency to close as aforesaid.

7. A spool cover comprising a ring or band provided with inwardly projecting means for receiving and locating the side walls of the spool in place, said means being so shaped as to facilitate reception and discharge of the spool by movement of the spool axially of the cover, the ends of the band overlapping at full width to form a full cylindrical wall, and being relatively slidable to permit expansion of the cover during reception or discharge of the spool by axial movement as aforesaid, said band normally tending to close to its small dimension.

8. A container for a tape spool, said container comprising a closed ring or band of sheet metal provided with marginal beads for receiving and locating the side walls of the spool in place, said beads being so rounded in section, that is, in the direction of the axis of the container, as to facilitate reception and discharge of the spool by movement of the spool axially of the container, the junction of the ends of the band being slidable to permit ready expansion of the container during reception or discharge of the spool by axial movement as aforesaid, the configuration of the band being such as to provide a full cylindrical wall characterized by spring tension tending to close the band to its small dimension.

9. A spool cover comprising a closed ring or band provided with inwardly projecting means for receiving and locating the side walls of the spool in place, said means being so shaped as to facilitate reception and discharge of the spool by movement of the spool axially of the cover, the ends of the band overlapping at full width to form a full cylindrical wall, and being relatively slidable to permit expansion of the cover during reception or discharge of the spool by axial movement as aforesaid, said band normally tending to close to its small dimension, one end of said band having a tongue slidably received in a mating space formed in the other end of said band.

10. A spool cover comprising a ring or band provided with inwardly projecting means for receiving and locating the side walls of the spool in place, said means being so disposed and so rounded in the direction of the axis of the cover, as to facilitate sliding of the spool through the cover, the ends of the band overlapping at full width to form a full cylindrical wall, and being relatively slidable to permit expansion of the cover during the sliding of the spool through the cover, said band normally tending to close to its small dimension, one end of said band having a tongue slidably received in a mating space formed in the other end of said band, and means preventing the tongue from being fully withdrawn from said mating space.

11. In combination, a tape spool and a container therefor, said tape spool comprising a cylindrical portion and circular side walls or flanges secured thereto, said container comprising a ring or band of sheet metal provided with marginal beads for receiving and locating the side walls of the spool in place, said beads being rounded in section to facilitate sliding of the spool through the container, the ends of the band overlapping at full width to form a full cylindrical wall, and being relatively slidable to permit ready expansion of the container during sliding of the spool through the container, the configuration of the band being such as to provide spring tension tending to close the band to its small dimension.

12. In combination, a tape spool and a container therefor, said tape spool comprising a cylindrical tape-receiving portion and circular side walls or flanges secured thereto, said container comprising a closed ring or band of sheet metal provided with marginal beads for receiving and locating the side walls of the spool in place, said beads being so rouned in section, that is, in the direction of the axis of the container, as to facilitate reception and discharge of the spool by movement of the spool axially of the cover, the ends of the band being relatively slidable to permit ready expansion of the container during reception or discharge of the spool by axial movement as aforesaid, one end of said band being formed into a tongue slidably received and housed in a mating space formed in the other end of said band, said tongue having a width substantially equal to the axial dimension of the container.

13. A spool cover comprising a ring or band provided with inwardly projecting means for receiving and locating the side walls of the spool in place, said means being so shaped as to facilitate reception and discharge of the spool by movement of the spool axially of the cover, the ends of the band overlapping at full width to form a full cylindrical wall, and being relatively slidable to permit expansion of the cover during reception or discharge of the spool by axial movement as aforesaid, said band normally tending to close to its small dimension, the band consisting of two strips of sheet metal, an inner strip having the aforesaid spool-locating means, and an outer strip the edges of which are folded inwardly and clamped upon the edges of the inner strip to lock the two strips together, one of said strips being projected beyond the other at one end of the band to form a tongue, the two strips at the opposite end of the band being separated slightly to receive said tongue, whereby the ends overlap as aforesaid.

14. A spool cover comprising a ring or band provided with inwardly projecting beads for receiving and locating the side walls of the spool in place, said means being so shaped as to facilitate reception and discharge of the spool by movement of the spool axially of the cover, the ends of the band overlapping at full width to form a full cylindrical wall, and being relatively slidable to permit expansion of the cover during reception or discharge of the spool by axial movement as aforesaid, said band normally tending to close to its small dimension, the band consisting of two strips of sheet metal, an inner strip having the aforesaid spool-locating beads, and an outer strip the edges of which are folded inwardly and clamped upon the edges of the inner strip to lock the two strips together, one of said strips being projected beyond the other at one end of the band to form a tongue, the two strips at the opposite end of the band being separated slightly to receive said tongue, whereby the ends overlap as aforesaid, the tongue being slotted and the mating band having teats engaging the slot to limit the permissible outward expansion of the band.

15. A spool cover comprising a ring or band provided with inwardly projecting means for receiving and locating the side walls of the spool in place, said means being so shaped as to facilitate reception and discharge of the spool by movement of the spool axially of the cover, the ends of the band overlapping at full width to form a full cylindrical wall, and being relatively slidable to permit expansion of the cover during reception or discharge of the spool by axial movement as aforesaid, said band normally tending to close to its small dimension, said band consisting of a strip of metal the outer edges of which are rolled outwardly and reversely to form flanges, the intermediate portion of said strip having the aforesaid spool-locating means, one end of said band being provided with a tongue extending beyond the flanges, and the other end of said band having the flanges spaced from the body of the band to receive the tongue, whereby the ends overlap as aforesaid.

16. A spool cover comprising a ring or band provided with inwardly projecting beads for receiving and locating the side walls of the spool in place, said means being so shaped as to facilitate reception and discharge of the spool by movement of the spool axially of the cover, the ends of the band overlapping at full width to form a full cylindrical wall, and being relatively slidable to permit expansion of the cover during reception or discharge of the spool by axial movement as aforesaid, said band normally tending to close to its small dimension, said band consisting of a strip of metal the outer edges of which are rolled outwardly and reversely to form flanges, the intermediate portion of said strip having the aforesaid spool-locating beads, one end of said band being provided with a tongue extending beyond the flanges, and the other end of said band having the flanges spaced from the body of the band to receive the tongue, whereby the ends overlap as aforesaid, one of said ends being slotted and the other of said ends having teats engaging the slots and limiting the opening or expansion of the band.

ARTHUR G. HOPKINS.